April 30, 1946.    F. E. BACHMAN    2,399,535
SPRING GROUP
Filed April 3, 1942    2 Sheets-Sheet 1
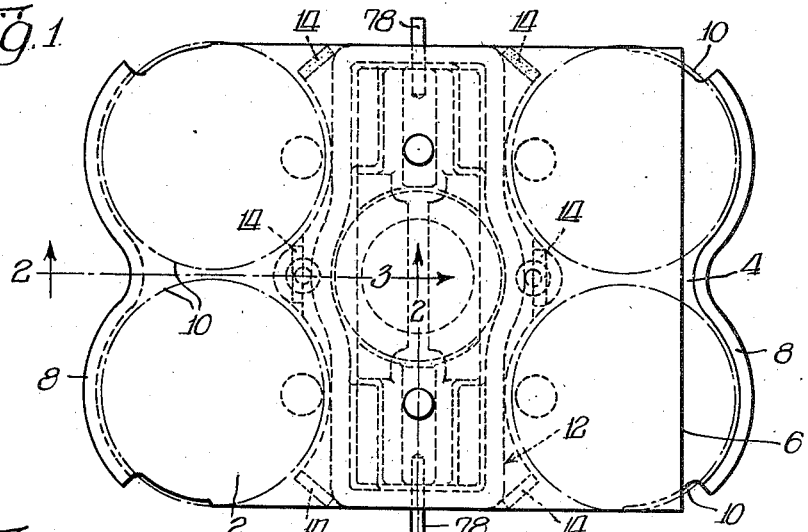
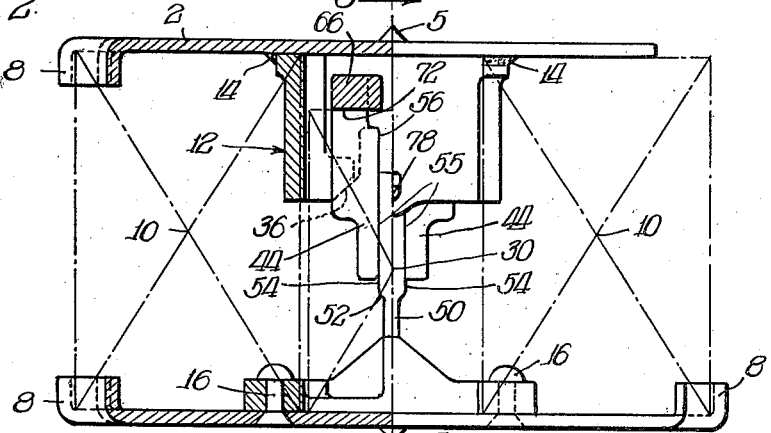
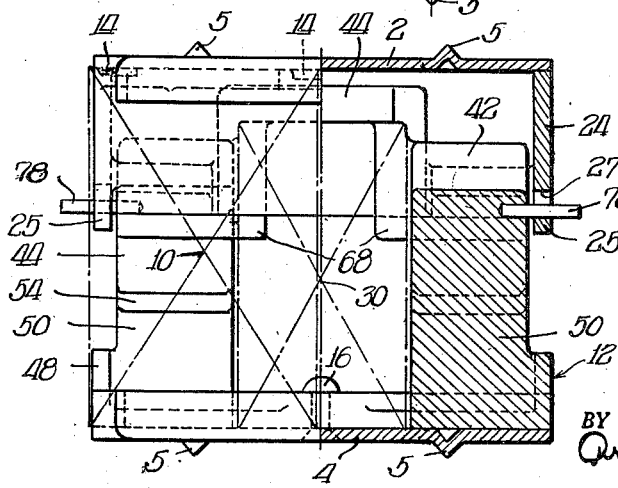
INVENTOR.
Fred E. Bachman,
BY April 30, 1946.  F. E. BACHMAN  2,399,535
SPRING GROUP
Filed April 3, 1942   2 Sheets-Sheet 2
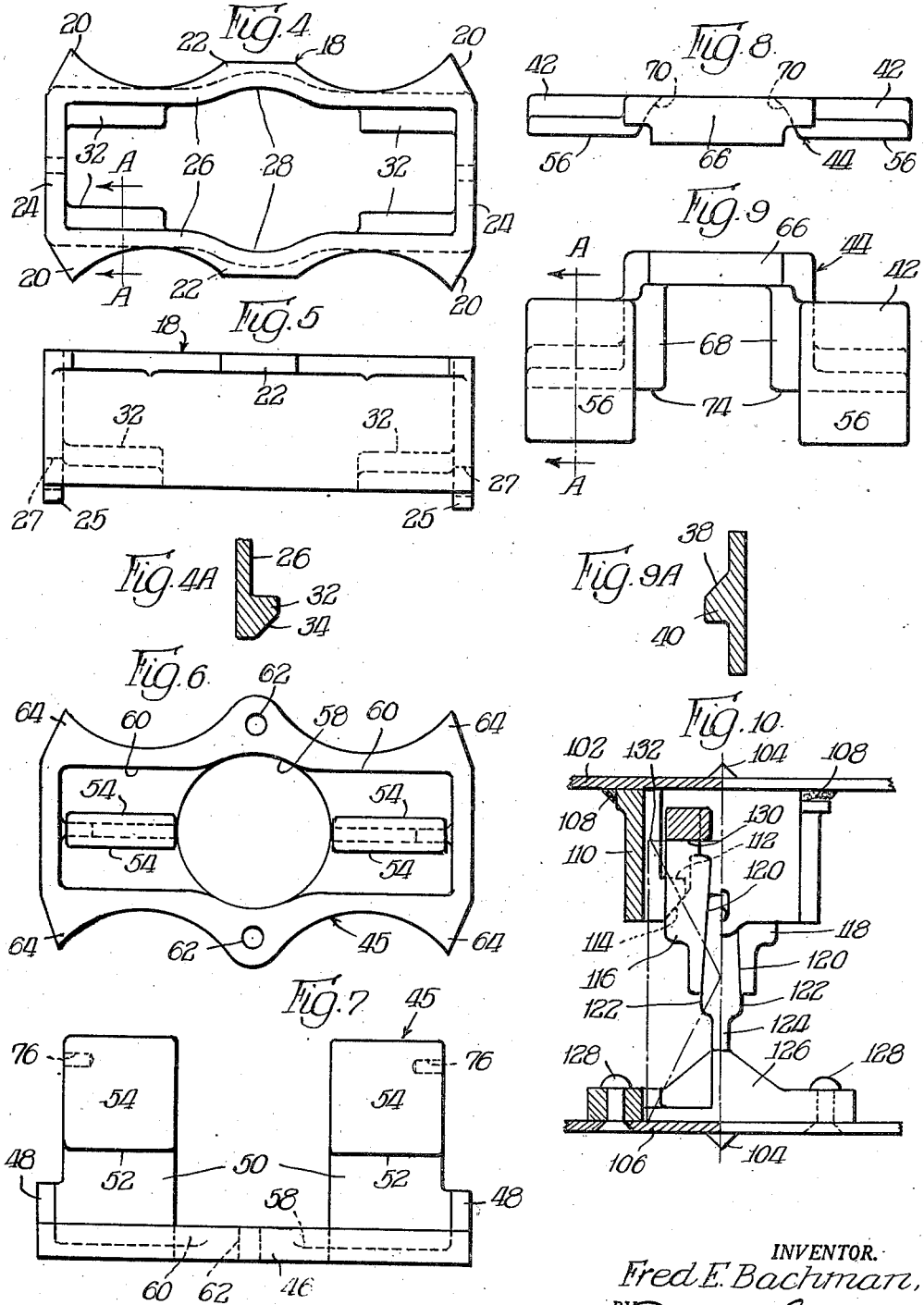
INVENTOR.
Fred E. Bachman, Patented Apr. 30, 1946

2,399,535

UNITED STATES PATENT OFFICE 2,399,535

SPRING GROUP

Fred E. Bachman, Chicago, Ill., assignor to American Steel Foundries, Chicago, Ill., a corporation of New Jersey Application April 3, 1942, Serial No. 437,512

23 Claims. (Cl. 267—9)

My invention relates to a spring group of the type sometimes designated a ride control group wherein one or more coil springs are utilized in conjunction with a friction absorbing device to prevent the setting up of harmonic oscillations in the spring group as well as to function in certain special manners as may be described.

The general object of my invention is to devise a form of spring group convenient for use in a railway car truck wherein a plurality of spring plates may confine at opposite ends thereof, coil springs, and intermediate said springs a friction absorbing device of such form as to facilitate its use in conjunction with said spring.

A specific object of my invention is to devise such a spring group with a friction device wherein wear surfaces may have relatively large area to permit long life and the development of constant friction therealong.

A different object of my invention is to devise such a spring group wherein the friction device with an internal coil spring or other resilient means serves to actuate the friction shoes on the release stroke while one follower of the device may actuate said shoes on the compression stroke.

Another object of my invention is to devise a friction device wherein one follower may be in the form of a housing arranged to support a plurality of friction shoes at opposite sides of said housing, each of said friction shoes being arranged to have frictional engagement with a central friction stem, said stem being in the form of a member integral with the other follower.

A yet different object of my invention is to devise a spring group with a friction device such as that described wherein one follower may have wedge engagement with friction shoes at opposite sides of the device, and the other follower may engage said shoes along surfaces substantially vertical which may be slightly tapered or not as desired.

In the drawings, Figure 1 is a top plan view of my novel spring group arrangement, and Figure 2 is a side elevation thereof, half in section, the section being taken substantially in the vertical transverse plane indicated by the line 2—2 of Figure 1.

Figure 3 is an end elevation thereof, half in section, the section being taken substantially in the vertical plane indicated by the line 3—3 of Figure 1.

Figures 4 and 5 show the detail of my novel form of follower housing, Figure 4 being a top plan view thereof, Figure 4A a fragmentary sectional view taken substantially in the transverse plane indicated by the line A—A of Figure 4, and Figure 5 a side elevation.

Figures 6 and 7 illustrate my novel form of opposed follower, Figure 6 being a top plan view thereof and Figure 7 a side elevation.

Figures 8 and 9 illustrate in detail my novel form of friction shoe, Figure 8 being a top plan view, Figure 9 a side elevation, and Figure 9A a sectional view taken through one of the friction ends thereof substantially in the plane indicated by the line A—A of Figure 9.

Figure 10 is a fragmentary view comparable to that of Figure 2 but illustrating a modification of my device.

Describing the structure in detail, it may be seen that my novel spring group arrangement comprises a top spring plate 2 and a bottom spring plate 4 each formed with positioning lugs 5, 5, said top spring plate being cut away adjacent the inner end thereof as at 6 to accommodate the tapering end portion of a load carrying member which may be superposed thereon, each of said spring plates having inturned flanges 8, 8 of scallop-like form serving to confine between said plates the coil springs diagrammatically indicated at 10, 10, each of said coil springs being disposed at one corner of the group and the intermediate space being occupied by my novel form of friction device generally designated 12, one follower of which may be welded as at 14, 14 to the top spring plate 2, and the opposite follower thereof may be secured to the bottom plate 4 as by riveting at 16, 16 or by other convenient means.

My novel friction device, as illustrated, utilizes a top follower housing 18, a box-like casting of rectangular form with end and intermediate flanges projecting laterally at the base thereof as indicated respectively at 20, 20 and 22, 22 (Figure 4), the edges of which may afford convenient surfaces for welding to the adjacent spring plate as already indicated. Said top follower comprises vertical end walls 24, 24 with central lugs 25, 25 drilled as at 27, 27 for a purpose hereafter to be described, and said follower also has vertical lateral walls 26, 26 arcuately bulged outwardly centrally thereof as at 28, 28 to accommodate the compression spring diagrammatically indicated at 30 (Figure 3). Adjacent each inner corner of the follower 18 may be formed a horizontal ledge or shelf 32, the ledges at each end being placed opposite each other on the side walls of the follower as may best be seen from the plan view of Figure 4. Each ledge 32 is formed with a diagonally arranged bottom surface 34 which may have frictional engagement as at 36 (Figure 2) with a complementary surface 38 formed on a similar horizontal ledge 40 as an integral part of each friction end portion 42 of each friction shoe generally designated 44.

My novel form of bottom follower generally designated 45 is shown in detail in Figures 6 and 7 whence it may be noted that said bottom follower comprises a base portion 46 of generally rectangular form with low end walls 48, 48 merging with the friction stems 50, 50 integrally formed therewith at opposite ends of the follower, each of said friction stems having a thickened upper portion of generally rectangular outline, said thickened portions being defined by shoulders 52, 52 at the lower edges thereof and having on opposite faces thereof friction surfaces 54, 54 for sliding engagement as at 55 (Figure 2) with the friction surfaces 56, 56 (Figure 9) formed on the adjacent faces at opposite ends of the respective friction shoes 44, 44. The base 46 of the bottom follower 45 is recessed centrally thereof to form a seat 58 for the before-mentioned compression spring 30, and the base 46 is also formed with low lateral walls 60, 60 which serve to reinforce the structure as do likewise the flaring central securing lugs 62, 62 as well as the end securing lugs 64, 64, each end lug 64 being designed for welding in manner similar to that described for the top follower in case it is deemed desirable. The large friction surfaces 54, 54 formed on each side of each friction stem afford relatively greater wearing area and thus insure long life in use.

The detail of my novel form of friction shoe 44 is illustrated in Figures 8 and 9. It will be seen that each shoe comprises a spaced friction end portion 42 joined by an intermediate bridge portion 66 elevated somewhat with respect to said friction end portions, the juncture of said bridge portion 66 and the respective friction end portions being reinforced by the walls 68, 68 arcuately formed on their adjacent faces as at 70, 70 to accommodate and serve as guide or guard means for the before-mentioned compression spring which is also afforded a seat as at 72 on said bridge portion 66. The lower extremity of each wall 68 may terminate in shoulders as at 74 intermediate the adjacent friction end portion, said shoulders being continued into the before-mentioned ledges or shelves 40 already referred to. A further view of the friction shoes partly in end elevation is shown in the sectional view of Figure 2. The manner in which my novel friction device functions will be readily apparent to those skilled in the art. It may be further noted that each friction stem 50 of the bottom follower is drilled as at 76 adjacent the upper outer edge thereof to accommodate a pin 78 (Figure 3) which may extend through the before-mentioned opening 27 in the lower edge of the adjacent end wall 24 of the top follower, said pin acting as retaining means for the parts by holding the spring 30 under some precompression until the spring group may be placed in operative position after which the pins 78, 78 may be removed and discarded. It should be observed that my friction device affords relatively large plain friction areas which will afford maximum wear and permit the development of substantially constant friction over a long life. It may be further noted that the diagonal face engagement at 36 between the lugs on the top follower and the lugs on the respective friction shoes are effective to urge said shoes into tight engagement with the friction faces 54, 54 on opposite sides of the friction stems 50, 50 on the bottom follower. The engaging surfaces at 38, 38 are positioned at all times below the top of the friction surfaces 54, 54 as may be noted in Figure 2 so that there is no tendency to tip the friction shoes 44, 44. Any such tipping, furthermore, will be restrained by the compression spring which is housed between the friction shoes as already described and upon which the friction shoes are seated through the medium of the bridge portion 66.

The modification of my invention illustrated in Figure 10 is substantially identical to that just described except that the engaging surfaces of the friction stem on the bottom follower and the friction shoes are tapered somewhat instead of vertically arranged as shown in Figure 2. The view of Figure 10 is fragmentary but comparable to the central portion of Figure 2. The modification comprises a top spring plate 102 with positioning means 104, the bottom spring plate 106 with positioning means 104, said top spring plate 102 being welded as at 108, 108 to the top follower 110 of the friction device, said top follower being substantially identical to that described for the previous modification, each side wall thereof having a horizontal ledge 112 having diagonal face engagement as at 114 with a similarly formed horizontal ledge 116 formed as an integral part of the friction shoe 118, each friction shoe 118 having tapering face engagement as at 120 with the adjacent friction face 122 of the friction stem 124, said stem being formed as an integral part of the bottom follower 126 which may be secured as at 128, 128 to said bottom spring plate 106. Each friction shoe may seat as at 130 on the compression spring 132. It will be understood that the parts illustrated in Figure 10 are substantially identical to those described for the previous modification except for the fact that each friction shoe 118 has a tapering frictional face engagement at 120 with the friction stem 124.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a spring group, spaced plates, coil springs and a friction device confined in parallel therebetween with respective followers of said device secured to said plates, one of said followers presenting at each end thereof a pair of opposed diagonally arranged surfaces, the other of said followers having at each end thereof a friction stem interposed between the adjacent surfaces, friction shoes at opposite sides of said device, each shoe having frictional engagement with both of said stems and abutment with one diagonal surface of each pair, and resilient means between said last-mentioned follower and said shoes, the engaging surfaces of each shoe with respective stems being co-planar.

2. In a spring group, spaced plates, coil springs and a friction device confined in parallel therebetween with respective followers of said device secured to said plates, one of said followers presenting at each end thereof a pair of opposed diagonally arranged surfaces, the other of said followers having at each end thereof a friction stem interposed between the adjacent surfaces, friction shoes at opposite sides of said device, each shoe having frictional engagement with both of said stems and abutment with one diagonal surface of each pair, and a compression spring between said last-mentioned follower and said shoes, the engaging surfaces of respective shoes with each stem being in parallel planes.

3. In a spring group, spaced plates, coil springs and a friction device confined in parallel therebetween with respective followers of said device secured to said plates, one of said followers presenting at each end thereof a pair of opposed diagonally arranged surfaces, the other of said followers having at each end thereof a friction stem interposed between the adjacent surfaces, friction shoes at opposite sides of said device, each shoe having frictional engagement with both of said stems and abutment with one diagonal surface of each pair, and a compression spring between said stem supporting follower and said shoes, the engaging surfaces of each stem with respective shoes being along converging planes.

4. In a spring group, spaced spring plates, a coil spring and a friction device confined in parallel between said plates with opposite followers of said device secured respectively to said plates, one of said followers having at each end thereof opposed ledges with diagonal faces, the other of said followers having at each end thereof a friction stem supporting friction surfaces intermediate the respective sets of ledges, a compression spring between said stems, and a pair of friction shoes supported on said spring in engagement with said surfaces, and areas on said shoes respectively complementary to the adjacent diagonal faces for engagement therewith.

5. In a spring group, top and bottom plates, coil springs confined therebetween, and a friction device interposed between said springs with respective followers secured to said plates, one of said followers having spaced ledges at each end thereof, and the other of said followers supporting a friction stem at each end thereof between respective sets of ledges, a compression spring supported in said group with an end fixed against relative movement with respect to one of said followers, and a pair of friction shoes supported from the other end of said spring, each shoe having frictional engagement with both of said stems and engaging certain of said ledges for actuation thereby, the shoe engaging surfaces of each stem being diagonally arranged.

6. In a spring group, top and bottom plates, coil springs confined therebetween, and a friction device interposed between said springs with respective followers secured to said plates, one of said followers having spaced ledges at each end thereof, and the other of said followers supporting a friction stem at each end thereof between respective sets of ledges, a compression spring associated with said group and having an end so seated as to prevent relative movement with respect to one of said followers, and a pair of friction shoes supported on the other end of said spring, each shoe having frictional engagement with both of said stems and engaging certain of said ledges for actuation thereby, the engagement of each stem with respective shoes being along converging faces.

7. In a spring group, top and bottom plates, coil springs confined therebetween, and a friction device interposed between said springs with respective followers secured to said plates, one of said followers having spaced ledges at each end thereof and the other of said followers supporting a friction stem at each end thereof between respective sets of ledges, a pair of friction shoes each having frictional engagement with both of said stems and engaging certain of said ledges for actuation thereby, the engaging faces of each stem with respective shoes being along parallel surfaces, and a coil spring associated with said group, said coil spring having an end fixed against movement with respect to one of said followers and having the opposite end engaging said shoes for actuation thereof.

8. In a spring group, top and bottom plates, coil springs confined therebetween, and a friction device interposed between said springs with respective followers secured to said plates, one of said followers having spaced ledges at each end thereof, and the other of said followers supporting a friction stem at each end thereof between respective sets of ledges, a compression spring associated with said group and having a seat fixed against movement with respect to one of said followers, and a pair of friction shoes supported on said spring, each shoe having frictional engagement with both of said stems and engaging certain of said ledges for actuation thereby, the stem engaging surfaces of each shoe being coplanar.

9. In a spring group, spaced plates, coil springs and a friction device confined in parallel therebetween with respective followers of said device secured to said plates, one of said followers presenting at each end thereof a pair of opposed diagonally arranged surfaces, the other of said followers having at each end thereof a friction stem interposed between the adjacent surfaces, friction shoes at opposite sides of said device, each shoe having frictional engagement with both of said stems and abutment with one diagonal surface of each pair, and a compression spring between said friction stem follower and said shoes.

10. In a spring group, top and bottom plates, a plurality of coil springs confined between said plates adjacent opposite ends thereof, and a friction absorbing device interposed between said springs with opposite followers thereof secured respectively to said plates, one of said followers presenting at each end thereof a pair of parallel friction faces, a pair of friction shoes each having friction surfaces engaging one face of each pair, each of said friction shoes having diagonal face engagement with the other of said followers, and a compression spring interposed between said shoes and said first-mentioned follower.

11. In a spring group, top and bottom plates, a plurality of coil springs confined between said plates adjacent opposite ends thereof, and a friction absorbing device interposed between said springs with opposite followers thereof secured respectively to said plates, one of said followers presenting at each end thereof a pair of non-parallel friction faces, a pair of friction shoes each having friction surfaces engaging one face of each pair, each of said friction shoes having diagonal face engagement with the other of said followers, and a compression spring interposed between said shoes and said first-mentioned follower.

12. In a spring group, top and bottom plates, a plurality of coil springs confined between said plates adjacent opposite ends thereof, and a friction absorbing device interposed between said springs with opposite followers thereof secured respectively to said plates, one of said followers presenting at each end thereof a pair of converging friction faces, a pair of friction shoes each having friction surfaces engaging one face of each pair, each of said friction shoes having diagonal face engagement with the other of said followers, and a compression spring interposed between said shoes and said first-mentioned follower.

13. In a spring group, top and bottom plates, coil springs confined therebetween, and a friction device interposed between said springs with respective followers secured to said plates, one of said followers having spaced ledges at each end thereof, and the other of said followers supporting a friction stem at each end thereof between respective sets of ledges, a compression spring having an end fixed against relative movement with respect to one of said followers, and a pair of friction shoes supported on the other end of said spring, each shoe having frictional engagement with both of said stems and engaging certain of said ledges for actuation thereby.

14. In a spring group, top and bottom spring plates, coil springs confined therebetween, a friction device interposed between certain of said springs with followers secured respectively to said plates, one of said followers presenting at each end thereof diagonal faces, and the other of said followers having at each end thereof a friction stem interposed between adjacent faces, each of said friction stems presenting on opposite sides thereof friction surfaces, a compression spring having an end fixed against relative movement with respect to said other follower, and a pair of friction shoes supported on said spring in engagement with one surface and one face at each end of said device.

15. In a spring group, top and bottom spring plates, coil springs confined therebetween, a friction device interposed between said coil springs and having followers secured to said plates respectively, one of said followers having opposed shoe actuating means at each end thereof, and the other of said followers presenting at each end a friction stem between the adjacent opposed means, a compression spring between said stems, and a pair of friction shoes, each shoe having frictional engagement with each stem and abutting adjacent actuating means, said spring bearing against said shoes and the last-mentioned follower.

16. In a spring group, a coil spring and a friction device in parallel, said friction device having opposed followers, one of said followers having shoe actuating means at each end thereof, and the other of said followers presenting at each end thereof a friction stem between the adjacent means, a friction shoe at each side of said device operable by said actuating means and engaging both of said stems, and a compression spring between said shoes and said stem follower.

17. In a spring group, top and bottom spring plates, coil springs confined therebetween, a friction device interposed between said coil springs and having followers secured to said plates respectively, one of said followers having opposed shoe actuating means at each end thereof, and the other of said followers presenting at each end a friction stem between the adjacent opposed means, a compression spring associated with said group and having an end fixed against relative movement with respect to one of said followers, and friction shoes supported from said spring, operable by said actuating means and engaging said stems.

18. In a friction device, a friction shoe comprising a friction plate at each end thereof and bridge means joining said plates and affording a seat for an associated spring, and arcuate spring positioning walls on the adjacent edges of said plates.

19. A friction shoe having end portions with parallel friction faces, and an integral bridge intermediate said end portions affording a seat for an associated coiled compression spring, said end portions being reinforced by walls merging with the adjacent edges of said portions and said bridge, said walls being arcuately formed on their adjacent faces to afford positioning means for said spring.

20. In a friction absorbing device, spaced followers, one of said followers presenting at each end thereof diagonal faces, the other of said followers having at each end thereof a friction stem interposed between adjacent faces, each of said stems presenting friction surfaces on opposite sides thereof, a pair of friction shoes each engaging one surface and one face at each end of the device, and resilient means having an end fixed with respect to one of said followers and the opposite end operatively associated with said shoes for urging them into engagement with the associated surfaces and faces.

21. In a friction absorbing device, spaced followers, one of said followers having shoe actuating means at each end thereof and the other of said followers presenting at each end thereof a friction stem between the adjacent means, a friction shoe at each side of said device operable by said actuating means and engaging both of said stems, and resilient means urging said shoes into said engagement, said resilient means being disposed intermediate the stems of said other follower.

22. In a friction device, a follower having opposed shoe actuating means at each end thereof, a member supporting spaced friction stems each disposed between the adjacent opposed means, friction shoes engaging said means for actuation thereby and engaging said stems at opposite sides thereof, and resilient means intermediate said stems and cooperating with said shoes for urging the latter into engagement with said opposed means and said stems.

23. In a friction device, a housing follower comprising a pair of spaced opposed internal wedge faces at each end thereof, a member supporting spaced friction stems each disposed intermediate one pair of said faces, friction shoes engaging said faces and said stems, and resilient means intermediate said stems and cooperating with said shoes for urging the latter into said engagement.

FRED E. BACHMAN.